United States Patent
Takakuwa et al.

(10) Patent No.: US 10,414,008 B2
(45) Date of Patent: Sep. 17, 2019

(54) METHOD FOR SUPPLYING CUTTING OIL

(71) Applicant: Matsuura Machinery Corporation, Fukui, Fukui (JP)

(72) Inventors: Hiroaki Takakuwa, Fukui (JP); Ryuji Hirose, Fukui (JP); Hiroshi Arakawa, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 16/124,540

(22) Filed: Sep. 7, 2018

(65) Prior Publication Data

US 2019/0091821 A1    Mar. 28, 2019

(30) Foreign Application Priority Data

Sep. 22, 2017  (JP) ................. 2017-181897

(51) Int. Cl.
| | |
|---|---|
| *B23Q 11/10* | (2006.01) |
| *F16N 29/02* | (2006.01) |
| *B23Q 17/00* | (2006.01) |

(52) U.S. Cl.
CPC ...... *B23Q 11/1084* (2013.01); *B23Q 11/1038* (2013.01); *B23Q 11/1061* (2013.01); *B23Q 17/007* (2013.01); *F16N 29/02* (2013.01); *F16N 2260/04* (2013.01); *F16N 2270/10* (2013.01)

(58) Field of Classification Search
CPC ............ B23Q 11/1069; B01D 17/0205; B01D 17/0208; B01D 17/0217; B01D 17/044
USPC ........................................ 184/6.14
See application file for complete search history.

(56) References Cited

U.S. PATENT DOCUMENTS

| | | | | |
|---|---|---|---|---|
| 2,653,517 | A * | 9/1953 | Pigott ............. | B24B 55/02 409/132 |
| 3,618,706 | A * | 11/1971 | Wall ............... | B23G 7/00 184/109 |
| 3,618,707 | A * | 11/1971 | Sluhan ............ | B23Q 11/1069 184/109 |
| 3,750,847 | A * | 8/1973 | Sluhan ............ | B23Q 11/1069 184/109 |
| 3,897,335 | A * | 7/1975 | Brandt ............ | C10M 175/04 210/774 |
| 3,946,835 | A * | 3/1976 | Siclari ............ | B01D 1/223 184/70 |

(Continued)

FOREIGN PATENT DOCUMENTS

| | | |
|---|---|---|
| JP | 5-23612 A | 2/1994 |
| JP | 5-23651 A | 2/1994 |

(Continued)

*Primary Examiner* — Henry Y Liu
(74) *Attorney, Agent, or Firm* — Richard M. Goldberg

(57) ABSTRACT

A method for supplying cutting oil in a machine tool for cutting work pieces, including the steps of retaining cutting oil in a minimum reference quantity or an initial reference quantity in the cutting-oil tank, measuring a supply quantity per unit time q of the cutting oil flowing out from the cutting-oil tank and supplied to a cutting area of work pieces, either supplying the cutting oil to the cutting-oil tank by a quantity per unit time q' larger than q and the supply is stopped in the case where the cutting-oil tank is filled, and the supplying and stopping are repeated as necessary, or supplying the cutting oil to the cutting-oil tank by a quantity per unit time equal to the supply quantity per unit time q.

10 Claims, 1 Drawing Sheet

(56) References Cited

U.S. PATENT DOCUMENTS

| | | | | |
|---|---|---|---|---|
| 4,636,317 A * | 1/1987 | Lewis | B01D 17/00 | 210/748.11 |
| 4,655,940 A * | 4/1987 | Harms | B23Q 11/10 | 184/7.4 |
| 4,772,402 A * | 9/1988 | Love | B01D 36/02 | 210/104 |
| 4,865,724 A * | 9/1989 | Brandt | B01D 17/045 | 210/104 |
| 5,020,350 A * | 6/1991 | Knepp | B21D 22/28 | 72/347 |
| 5,090,225 A * | 2/1992 | Schimion | B21B 37/32 | 210/167.02 |
| 5,224,051 A * | 6/1993 | Johnson | G05D 21/02 | 184/6.14 |
| 5,244,586 A * | 9/1993 | Hawkins | B01D 36/02 | 210/806 |
| 5,246,088 A * | 9/1993 | Imai | B26D 7/088 | 184/29 |
| 5,262,071 A * | 11/1993 | Tuck | B23Q 11/1046 | 210/171 |
| 5,372,220 A * | 12/1994 | Jacobs | C10M 173/00 | 184/6.14 |
| 5,380,446 A * | 1/1995 | Bratten | B01D 37/00 | 184/6.24 |
| 5,466,380 A * | 11/1995 | Bratten | B01D 37/00 | 137/399 |
| 5,595,462 A * | 1/1997 | Hensley | B23Q 1/0036 | 408/1 R |
| 5,638,993 A * | 6/1997 | Hing | B23Q 11/1084 | 184/28 |
| 5,795,400 A * | 8/1998 | Berger | B01D 21/2461 | 134/10 |
| 5,800,104 A * | 9/1998 | Miyano | B01D 21/32 | 210/167.02 |
| 5,948,244 A * | 9/1999 | Fortier | B01D 17/0205 | 210/167.01 |
| 6,134,930 A * | 10/2000 | Shore | B21B 31/076 | 72/235 |
| 6,193,895 B1 * | 2/2001 | Dea | F01P 11/06 | 210/167.31 |
| 6,322,694 B1 * | 11/2001 | Iliadis | B01D 17/0208 | 210/167.01 |
| 6,343,610 B1 * | 2/2002 | Berger | B01D 21/2461 | 134/63 |
| 6,471,007 B1 * | 10/2002 | Takubo | F16N 7/32 | 184/43 |
| 6,938,633 B2 * | 9/2005 | Sugata | B23Q 39/023 | 137/1 |
| 7,018,959 B2 * | 3/2006 | McCullough | C10M 173/02 | 508/250 |
| 7,172,689 B2 * | 2/2007 | Bratten | B23Q 11/0057 | 137/484.2 |
| 8,894,852 B2 * | 11/2014 | Urban | B01D 35/00 | 210/181 |
| 9,022,175 B2 * | 5/2015 | Tagashira | B23Q 11/1061 | 184/6.14 |
| 9,616,540 B2 * | 4/2017 | Balaji | B23Q 11/1046 | |
| 9,810,211 B2 * | 11/2017 | Davidian | F04B 43/12 | |
| 10,266,789 B2 * | 4/2019 | Tanaka | C10M 175/0058 | |
| 2009/0026016 A1 * | 1/2009 | Matumura | B23Q 11/123 | 184/6.14 |

FOREIGN PATENT DOCUMENTS

| | | |
|---|---|---|
| JP | 6-11008 U | 2/1994 |
| JP | 8-196826 A | 8/1996 |
| JP | 5202142 B2 | 2/2013 |
| JP | 2017-524547 A | 8/2017 |

* cited by examiner

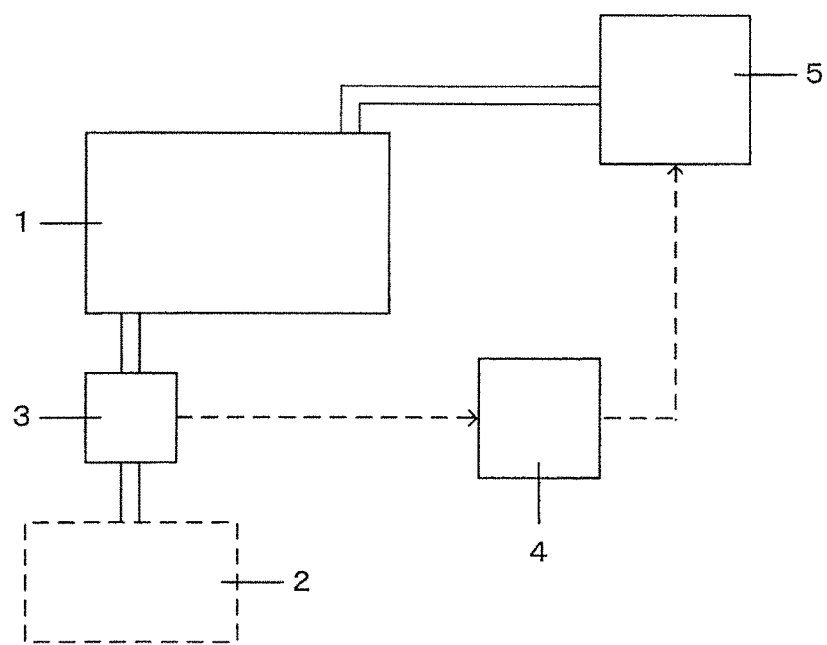

METHOD FOR SUPPLYING CUTTING OIL

TECHNICAL FIELD

The present invention relates to a method for supplying cutting oil which is used in a machine tool for cutting work pieces to a cutting-oil tank and a cutting area.

BACKGROUND ART

Where a machine tool is used to cut work pieces, it is essential to supply cutting oil to a cutting area in order to cool heat generated at the cutting area and also reduce cutting resistance.

It is well known that a quantity of cutting oil to be supplied is controlled in response to cutting of a work piece.

For example, in Patent Document 1, cutting oil to be supplied to a cutting area is varied in quantity, depending on a change in cutting length and cutting resistance (claims 1, 2 and 3). In Patent Document 2, cutting oil to be supplied to a cutting area is controlled for a quantity thereof in response to loads of a driving motor necessary for cutting (Abstract).

A machine tool is provided with a cutting-oil tank for supplying cutting oil to a cutting area. Each of the above-described prior arts requires such a technical precondition that cutting oil is normally supplied to a cutting-oil tank as a matter of course.

However, the above-described technical precondition is not always established.

Specifically, cutting oil supplied per unit time to a cutting area is different in quantity, depending on each work piece. In the prior arts, where one or a plurality of types of work pieces are cut, a special technical consideration is not necessarily given to appropriate supply of cutting oil to a cutting-oil tank so that the cutting oil can be supplied appropriately from the cutting-oil tank on cutting each work piece.

Incidentally, Patent Document 3 has disclosed a configuration in which cutting oil separated from chips is supplied to a cutting-oil tank 3 (Abstract). However, in this case, no adjustment is made for a quantity of the cutting oil to be supplied to the cutting-oil tank after consideration is given to a quantity of the cutting oil necessary for cutting a work piece.

Patent Document 4 has disclosed a configuration in which a first cutting-oil tank and a second cutting-oil tank are adjusted so as to be substantially equal in temperature (claim 1). However, no adjustment is made for a quantity of cutting oil supplied to both the cutting-oil tanks after consideration is given to a quantity of the cutting oil necessary for cutting a work piece.

Where cutting oil is not supplied sufficiently to the cutting-oil tanks, resulting in outflow from the tanks and the cutting oil is supplied to a cutting area in a larger quantity than before, cutting work must be stopped because the cutting oil is used up in the cutting-oil tanks.

The above-described stopping inevitably causes a serious decrease in work efficiency of a machine tool.

In order to avoid the above-described state of stopping, there can be expected such a method that where cutting oil inside a cutting-oil tank reaches a minimum reference quantity, the cutting oil is automatically supplied from a cutting-oil supply source to the cutting-oil tank to realize a state in excess of the minimum reference quantity.

Cutting oil necessary for cutting work pieces is different in quantity, depending on types of work pieces. In the above-described method, a reference quantity by which the cutting oil is supplied to the cutting-oil tank is not necessarily clear, with the above difference taken into account.

As described so far, in the prior arts, it can be said that no technically significant proposal has been made about supplying cutting oil to a cutting-oil tank or a cutting area in an appropriate quantity after consideration is given to the fact that the cutting oil is different in a necessary quantity depending on the types of work pieces to be cut.

PRIOR ART DOCUMENTS

Patent Documents

[Patent Document 1] Japanese Published Unexamined Patent Application No. H6-023651
[Patent Document 2] Japanese Published Unexamined Patent Application No. H6-23612
[Patent Document 3] Japanese Published Unexamined Patent Application No. H8-196826
[Patent Document 4] Japanese Patent No. 5202142

SUMMARY OF INVENTION

Problem to be Solved

An object of the present invention is to provide a configuration which supplies cutting oil appropriately to a cutting-oil tank and a cutting area based on the fact that in a machine tool for cutting work pieces, the cutting oil is different in a necessary quantity depending on the types of work pieces.

Means for Solving the Problem

In order to solve the above object, the present invention is composed of the following basic configurations:

(1) a method for supplying cutting oil which adopts following processes in a machine tool of cutting work pieces:

1: retaining cutting oil by a minimum reference quantity $Q_{min}$ in a cutting-oil tank, 2: measuring a supply quantity per unit time q of cutting oil which flows out from the cutting-oil tank and is also supplied to an area where work pieces are cut, 3: setting a supply quantity per unit time q' of cutting oil supplied so as to satisfy q'>q, and supplying the cutting oil to the cutting-oil tank by the above supply quantity per unit time q', 4: stopping supply to the cutting-oil tank at a stage when the tank is filled with cutting oil by the supply quantity per unit time q', and additional supplying cutting oil to the cutting-oil tank by the supply quantity per unit time q' when a retained quantity of cutting oil in the cutting-oil tank reaches a minimum reference quantity $Q_{min}$ due to said stopping, 5: repeating said stopping and said supplying by the supply quantity per unit time q' according to necessary state, and (2) a method for supplying cutting oil which adopts the following processes in a machine tool by cutting work pieces:

1: retaining cutting oil by an initial reference quantity $Q_0$ in a cutting-oil tank, 2: measuring a supply quantity per unit time q of cutting oil which flows out from the cutting-oil tank and is also supplied to an area where work pieces are cut, 3: supplying cutting oil based on a cutting amount per unit time which is equal to the supply quantity per unit time q supplied to the cutting-oil tank.

Advantageous Effects of Invention

Quantity of cutting oil supplied per unit time to a cutting area is different with each other according to the types of work pieces to be cut.

With the above difference taken into account, a quantity per unit time of the cutting oil supplied to the cutting area where various types of work pieces are to be cut is understood by referring to past experience or experiments performed beforehand and, then, it is possible to estimate a method for supplying the cutting oil in a state that the cutting oil will not be used up in the cutting-oil tank in response to cutting time of each work piece in using the cutting oil which flows out sequentially from the cutting-oil tank and is also supplied to the cutting area.

In fact, the applicant has already filed a patent application on the basis of the above-described method (Japanese Patent Application No. 2017-177811).

Contrarily, in present invention based on the basic configurations of (1) and (2), when each of work pieces is cut in advance, understanding the supply quantity q per unit time according to past experience or experiments performed beforehand is unnecessary, and suitable quantity per unit time of the cutting oil at a stage of supply to the cutting area is measured to supply the cutting oil for cutting continuously to the cutting-oil tank and the cutting area without understanding of a quantity per unit time of the cutting oil supplied to a cutting area, thus that makes it possible to supply the cutting oil appropriately by such a simple configuration.

BRIEF DESCRIPTION OF DRAWINGS

FIG. 1 is a block diagram which shows steps of the basic configurations (1) and (2). A dotted-line arrow shows a state that measurement signals are sequentially sent from a flow measuring meter of cutting oil to a cutting-oil supply source by way of a controller.

DESCRIPTION OF EMBODIMENTS

As shown in FIG. 1, the methods for basic configurations (1) and (2) can be each realized by a flow measuring meter 3 which is placed between a cutting-oil tank 1 and a cutting area 2, a flow measuring meter 3 which detects a quantity of the cutting oil supplied per unit time from the cutting-oil tank 1 to the cutting area 2, and a controller 4 which instructs a cutting oil supply source 5 to supply the cutting oil by a supply quantity per predetermined unit time according to a flow rate by the flow measuring meter 3.

According to the basic configuration (1), in a process 1, the cutting oil is retained in advance in a minimum reference quantity $Q_{min}$ in the cutting-oil tank 1, in a process 2, a supply quantity per unit time 1 of the cutting oil which flows out from the cutting-oil tank 1 and is also supplied to the cutting area 2 is measured by using the flow measuring meter 3, and in a process 3, a supply quantity per unit time q' of the cutting oil is set so as to satisfy q'>q by using the controller 4 and then, the cutting oil is supplied by the supply quantity per unit time q' from the cutting oil supply source 5 to the cutting-oil tank 1.

When the cutting oil is supplied by the supply quantity per unit time q' to the cutting-oil tank 1, we may predict a possibility that the cutting oil may be supplied to the cutting-oil tank 1 up to a full capacity thereof, that is, until the cutting-oil tank 1 is filled up, since the supply quantity per unit time q' is larger than the supply quantity per unit time q of the cutting oil which is discharged at the same time from the cutting-oil tank 1.

In a process 4 standing on the above-described processes, supplying the cutting oil by the supply quantity per unit time q' is stopped at a stage supplied up to a full capacity of the cutting-oil tank 1.

On account of the above-described stopping, quantity of the cutting oil is gradually decreased in the cutting-oil tank 1.

However, when the cutting oil reaches a minimum reference quantity $Q_{min}$, the cutting oil is supplied again by the supply quantity per unit time q' to the cutting-oil tank 1.

In a process 5, said stopping and said supplying are repeated according to necessary state.

Note that the cutting oil is subjected to circulation processing in which, after being supplied to the cutting area 2, chips etc. are removed and returned to the cutting oil tank 1 again. However, the cutting oil is gradually decreased in quantity with the occurrence of evaporation from the above-described circulation and also by disposal of waste including chips etc. in above removal. Therefore the cutting oil is supplied to the cutting-oil tank 1 by replacement of the thus decreased quantity.

Above-described retained quantity will be theoretically sufficient as long as it is $q_m \cdot \Delta t$, where the largest quantity per unit time supplied to the cutting area 2 is given as $q_m$ and a time lag between measurement in the process 1 and supply to the cutting-oil tank 1 in the process 2 is given as $\Delta t$ on cutting various types of work pieces.

However, in an actual work in usually adopted method, with consideration for safety, in the case that a supply quantity which is clearly larger than a supply quantity per unit time of the cutting oil supplied to the cutting area 2 of work pieces is given as $q_0$ and an average cutting time of a work piece is given as $t_0$, the minimum reference quantity $Q_{min}$ satisfying $Q_{min} = q_0 \cdot t_0$ is adopted.

Note that as the quantity per unit time $q_0$ which is clearly larger than the quantity per unit time q of the cutting oil supplied to the cutting area 2, the quantity $q_0$ is selected by the state much larger than the quantity per unit time q with wide difference.

A relationship between q' and q can include any of a proportional relationship in which a that is larger than one is given as a constant of proportionality, for example, $q' = a \cdot q$ (under condition of a>1), or in which q' is constantly larger than q only by a predetermined value b, for example, $q' = q + b$ (under condition of b>0), and a relationship in which supply to the cutting-oil tank 1 is achieved by a difference between q and an inverse proportion factor of c/q, for example, $q' = q + c/q$ (under condition of c>0). However, the above relationship shall not be limited to these embodiments.

In the case of the proportionally different relationship, the larger the supply quantity per unit time q of the cutting oil which flows out from the cutting-oil tank 1 and is also supplied to the cutting area 2 is, the larger the supply quantity per unit time q' of the cutting oil supplied to the cutting-oil tank 1 becomes. Therefore, the cutting oil can be supplied reliably.

In the case of the constantly different relationship, it is possible to achieve a supply state by simple control in which the cutting oil is supplied by a supply quantity larger with b to the cutting-oil tank 1.

In the case of the relationship which reflects an inverse proportion factor of c/q, while q' is increased with an increase in q, q' is decreased accordingly with an increase in q by the above-described inverse proportion. So, as a whole, the cutting oil can be controlled so as to give an approximately uniform supply quantity.

According to the basic configuration (2), in the process 1, the cutting oil is retained in the initial reference quantity $Q_0$ and then, in the process 2, a supply quantity per unit time q of the cutting oil which flows out from the cutting-oil tank 1 and is also supplied to the cutting area 2 is measured by using the flow measuring meter 3.

Then, in the process 3, with the controller 4, the cutting oil is supplied from the cutting oil supply source 5 to the cutting-oil tank 1 by a supply quantity which is identical to the supply quantity per unit time q measured in the process 2.

In the basic configuration (2) described above, the supply quantity of the cutting oil which flows out from the cutting-oil tank 1 and is also supplied to the cutting area 2, and the supply quantity of the cutting oil which is supplied to the cutting-oil tank 1 are equal to each other in terms of a supply quantity per unit time. Therefore, the cutting oil is continuously supplied to the cutting-oil tank 1 in a state of being retained constantly in an initial reference quantity $Q_0$ in the cutting-oil tank 1.

Therefore, compared with the basic configuration (1), the basic configuration (2) can achieve a simple supply method in that it is not necessary to repeat supplying and stopping.

As with the minimum reference quantity described in the basic configuration (1), the initial reference quantity $Q_0$ is also theoretically sufficient as long as it is $q_m \cdot \Delta t$ where the largest quantity per unit time of the cutting oil supplied to the cutting area 2 is given as $q_m$ and a time lag between measurement in the process 2 and supply in the process 3 is given as it.

However, standing on the same reason to that of the minimum reference quantity described in the basic configuration (1), as to the initial reference quantity $Q_0$ with consideration for safety, in usually adopted method, in the case that a supply quantity per unit time which is clearly larger than a supply quantity per unit time q of the cutting oil supplied to the cutting area 2 of work pieces, that is, specifically, a supply quantity per unit time which is much larger is given as $q_0$ and an average cutting time of work pieces is given as $t_0$, the initial reference quantity $Q_0$ satisfying $Q_0 = q_0 \cdot t_0$ is adopted.

Hereinafter, a description will be given by referring to examples.

Example 1

Example 1 is characterized in that alarm signals are generated where the cutting oil is decreased in quantity lower than a predetermined quantity due to evaporation of the cutting oil from the cutting-oil tank 1 or an accident such as leakage etc. resulting from chips being clogged in the cutting-oil tank 1, and in the case of the evaporation, the cutting oil is supplied to the cutting-oil tank 1 in such a state that a supply quantity per unit time equals to a decreased quantity per unit time due to the evaporation or a supply quantity per unit time larger than the above quantity is added to a quantity supplied before occurrence of the accident.

As long as the cutting oil is supplied to the cutting-oil tank 1 and flows out from the cutting-oil tank 1 according to the basic configurations (1) and (2), there is no possibility that the cutting oil retained in the cutting-oil tank 1 becomes empty.

It is, however, impossible to exclude any possible occurrence of evaporation of the cutting oil or an accident due to leakage resulting from chips being clogged in the cutting-oil tank 1. If the cutting oil is used up due to the evaporation or the leakage, no cutting oil remains, and as a result, there is no choice but to stop cutting work.

In Example 1, in the case of evaporation, the cutting oil is supplied to the cutting-oil tank 1 in such a state that a supply quantity per unit time equal to a decreased quantity per unit time due to the evaporation or a supply quantity per unit time larger than the above quantity is added, by which it is therefore possible to continue cutting work without stopping also at a stage that the evaporation from the cutting-oil tank 1 has been recovered.

Example 2

Example 2 is characterized in that water-soluble cutting oil is adopted and, the larger the content of water is, the higher the concentration of the cutting oil supplied to the cutting-oil tank 1 is set.

The water-soluble cutting oil achieves a compatible state of oil components and water by action of a surfactant. When the concentration is different from a reference value, there is a tendency that lubrication functions are decreased at a cutting portion. Thus, in Example 2, the larger the water content of the cutting oil in the cutting-oil tank 1 is, the higher the concentration of the water-soluble cutting oil supplied to the cutting-oil tank 1 is set, and a ratio of the cutting oil to water in the cutting-oil tank 1 is adjusted to a predetermined concentration, thereby achieving an optimal concentration of the cutting oil at the cutting area 2.

The above-described Example 2 can achieve both cooling functions and lubrication functions even where the water-soluble cutting oil is adopted.

Note that, in the basic configuration (1), a description will be given of requirements compatible with Example 2 on the assumption that a relationship of $q' = q + c/q$ (under condition of $c > 0$)

is adopted. Where supply quantities which is supplied to the cutting area 2 in response to supply quantities per unit time $q_1'$, and $q_2'$ supplied to the cutting-oil tank 1 are given as $q_1$ and $q_2$, $q_1' - q_2' = (q_1 - q_2)(1 - c/q_1 \cdot q_2)$ is established.

Therefore, by setting a value of c which is clearly smaller than $q_1 \cdot q_2$, that is, a value which is clearly smaller than a square of a quantity of the cutting oil which ordinarily flows out from the cutting-oil tank 1 and is also supplied to the cutting area 2, thus a magnitude relationship between $q_1'$ and $q_2'$ can be made in agreement with a magnitude relationship between $q_1$ and $q_2$ because of $(1 - c/q_1 \cdot q_2) > 0$.

With regard to a value c clearly smaller than a square of a quantity of the cutting oil which ordinarily flows out from the cutting-oil tank 1 and is also supplied to the cutting area 2, for example, a value which is much smaller than the square can be adopted.

INDUSTRIAL APPLICABILITY

The present invention can keep a cutting state without stopping and with continuously supplying cutting oil to a cutting area of a machine tool for cutting work pieces, therefore, can be used in all types of machine tools for cutting work pieces.

REFERENCE SIGNS LIST

1: Cutting-oil tank
2: Cutting area
3: Flow measuring meter
4: Controller
5: Cutting-oil supply source

The invention claimed is:

1. A method for supplying cutting oil in a machine tool for cutting work pieces, comprising the steps of:
    retaining cutting oil of a minimum reference quantity $Q_{min}$ in a cutting-oil tank,
    measuring a supply quantity per unit time q of cutting oil which flows out from the cutting-oil tank and is also supplied to an area where work pieces are cut,
    setting a supply quantity per unit time q' of cutting oil supplied so as to satisfy q'>q, and supplying the cutting oil to the cutting-oil tank according to the above supply quantity per unit time q',
    stopping supply of cutting oil to the cutting-oil tank at a stage when the tank is filled with cutting oil according to the supply quantity per unit time q',
    additionally supplying cutting oil to the cutting-oil tank according to the supply quantity per unit time q' when a retained quantity of cutting oil in the cutting-oil tank reaches a minimum reference quantity $Q_{min}$ due to said stopping, and
    repeating said steps of stopping and supplying according to the supply quantity per unit time q' as necessary.

2. The method for supplying cutting oil according to claim 1, further comprising the step of adopting a relational expression of q'=a·q where a>1 is given.

3. The method for supplying cutting oil according to claim 1, further comprising the step of adopting a relational expression of q'=q+b where b>0 is given.

4. The method for supplying cutting oil according to claim 1, further comprising the step of adopting a relational expression of q'=q+c/q where c>0 is given.

5. A method for supplying cutting oil in a machine tool for cutting work pieces, comprising the steps of:
    retaining cutting oil of an initial reference quantity $Q_0$ in a cutting-oil tank,
    measuring a supply quantity per unit time q of cutting oil which flows out from the cutting-oil tank and is also supplied to an area where work pieces are cut,
    supplying cutting oil based on a cutting amount per unit time which is equal to the supply quantity per unit time q supplied to the cutting-oil tank.

6. The method for supplying cutting oil according to claim 1, further comprising the steps of:
    when water-soluble cutting oil is adopted and, the larger the water content of the cutting oil in the cutting-oil tank, setting a higher the concentration of the water-soluble cutting oil supplied to the cutting-oil tank, and adjusting a ratio of the cutting oil to water in the cutting-oil tank to a predetermined concentration.

7. The method for supplying cutting oil according to claim 2, further comprising the steps of:
    when water-soluble cutting oil is adopted and, the larger the water content of the cutting oil in the cutting-oil tank, setting a higher the concentration of the water-soluble cutting oil supplied to the cutting-oil tank, and adjusting a ratio of the cutting oil to water in the cutting-oil tank to a predetermined concentration.

8. The method for supplying cutting oil according to claim 3, further comprising the steps of:
    when water-soluble cutting oil is adopted and, the larger the water content of the cutting oil in the cutting-oil tank, setting a higher the concentration of the water-soluble cutting oil supplied to the cutting-oil tank, and adjusting a ratio of the cutting oil to water in the cutting-oil tank to a predetermined concentration.

9. The method for supplying cutting oil according to claim 4, further comprising the steps of:
    when water-soluble cutting oil is adopted and, the larger the water content of the cutting oil in the cutting-oil tank, setting a higher the concentration of the water-soluble cutting oil supplied to the cutting-oil tank, and adjusting a ratio of the cutting oil to water in the cutting-oil tank to a predetermined concentration.

10. The method for supplying cutting oil according to claim 5, further comprising the steps of:
    when water-soluble cutting oil is adopted and, the larger the water content of the cutting oil in the cutting-oil tank, setting a higher the concentration of the water-soluble cutting oil supplied to the cutting-oil tank, and adjusting a ratio of the cutting oil to water in the cutting-oil tank to a predetermined concentration.

\* \* \* \* \*